United States Patent [19]

McCoin

[11] 4,322,798

[45] Mar. 30, 1982

[54] TRACTION PRESSURE CONTROL SYSTEM

[75] Inventor: Dan K. McCoin, El Paso, Tex.

[73] Assignee: Bales-McCoin Research, Inc., El Paso, Tex.

[21] Appl. No.: 119,466

[22] Filed: Feb. 7, 1980

Related U.S. Application Data

[63] Continuation-in-part of Ser. No. 878,664, Feb. 16, 1978, abandoned.

[51] Int. Cl.³ .................... F16H 37/06; G06F 15/20
[52] U.S. Cl. ............................. 364/424; 364/424.1; 74/191; 74/208
[58] Field of Search .............. 364/424, 425, 431, 432, 364/442; 74/208, 212, 190.5, 191, 752 D, 861, 866, 856, 859

[56] References Cited

U.S. PATENT DOCUMENTS

| | | | |
|---|---|---|---|
| 3,745,844 | 7/1973 | Schottler | 74/208 |
| 4,098,145 | 7/1978 | Dickinson | 74/191 |
| 4,106,368 | 8/1978 | Ivey | 364/424 |
| 4,107,776 | 8/1978 | Beale | 364/424 |
| 4,192,200 | 3/1980 | McCoin | 74/191 |
| 4,192,201 | 3/1980 | McCoin | 74/191 |

Primary Examiner—Mark E. Nusbaum
Assistant Examiner—Gary Chin
Attorney, Agent, or Firm—Harvey B. Jacobson

[57] ABSTRACT

Actual slip is determined from deviation of measured speeds of traction drive elements and known "no-slip" ratio for the drive ratio settings of a traction drive transmission. An error signal is generated whenever the relationship between the foregoing actual slip and traction pressure is outside defined limits to correct traction pressure as a function of the error signal.

17 Claims, 13 Drawing Figures

TRACTION PRESSURE CONTROL SYSTEM

BACKGROUND OF THE INVENTION

This invention relates to traction drive transmissions in general and in particular to a system for correctively varying the traction pressure between the drive elements of a transmission of the type disclosed, in my prior co-pending applications, now U.S. Pat. Nos. 4,192,200 and 4,192,201, and in my prior copending application Ser. No. 878,664, filed Feb. 16, 1978, now abandoned with respect to which the present application is a continuation-in-part.

In a traction drive transmission, torque transmitted between the engaging drive elements is occasioned by a certain amount of slip. The amount of slip will depend on the traction pressure force exerted to maintain the drive elements in surface contact with each other. Further, for any given traction pressure, the slip may vary because of changes in temperature, traction surface conditions, peripheral velocities and drive ratio position. Heretofore, the traction pressure was designed to obtain transmission of torque with substantially no slip. However, efficient power transfer occurs only within a narrow range of optimum slip conditions so that prior systems which seek to limit slip often produce excessive contact pressure and limit power transfer capacity and the operational life of the transmission. Excessive slip, on the other hand, is also inefficient and undesirable because of excessive wear, thermal destruction of the friction or traction engaging surfaces of the drive elements, and loss of traction at a progressively increasing rate.

As indicated in my prior copending application Ser. No. 878,664 aforementioned, there is an optimum amount of slip during transmission at any given drive ratio corresponding to a peak traction pressure at which the traction pressure remains substantially constant within a narrow range as the slip increases. Thus, it is desirable to regulate the traction pressure so as to remain within the foregoing narrow range corresponding to a portion of the traction curve reflecting the relationship between traction pressure and slip for each drive ratio setting of the transmission. According to my prior copending application, the actual slip determined by sensing the traction roller speeds and drive ratio setting of the transmission is compared with the optimum slip empirically determined from such traction curves to control the amount of traction pressure applied. Such a system does not, however, take into account variable factors such as temperature, fluid properties, component geometry, speed, spin moment, ratio setting and traction surface conditions that may alter optimum slip values.

SUMMARY OF THE INVENTION

Traction roller speeds are monitored to calculate actual speed ratio for comparison with the theoretical speed ratio corresponding to the drive ratio setting also being monitored, in order to compute actual slip as disclosed in my prior copending application aforementioned. In accordance with the present invention, either empirical data or the actual traction pressure exerted is sensed for comparison with actual slip to determine the ratio of the change in traction pressure to the change in actual slip. This ratio will approach infinity when the traction pressure corresponds to optimum slip. A reference signal is therefore electronically generated corresponding to the aforesaid ratio and a narrow signal band is selected embracing the peak signal level in order to establish an optimum signal reference from which any deviation below the level of the reference signal produces an error signal for correctively varying the traction pressure.

A resulting pressure correction signal is modified by an absolute slip offset signal in the selected signal band. Logic gating is utilized to reduce the correction signal level during increasing slip and to prevent application of erroneous error signals during transitional conditions to prevent damage to the system.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

DETAILED DESCRIPTION OF SPECIFIC EMBODIMENT

Figure 1:
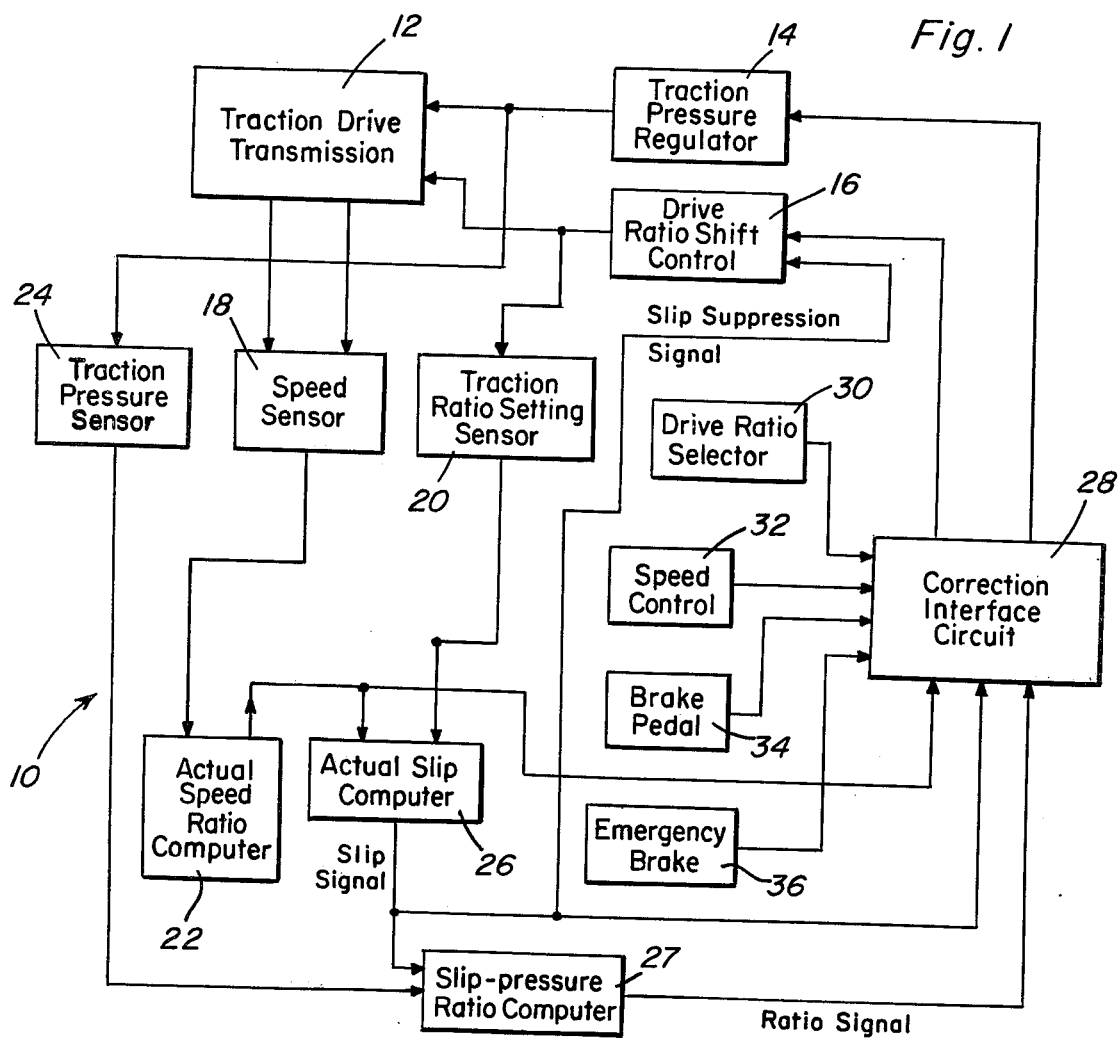
FIG. 1 is a schematic block diagram depicting the general system of the present invention.

Referring now to the drawings in detail, FIG. 1 schematically illustrates a transmission control system generally referred to by reference numeral 10 associated with a traction drive type of split-torque transmission generally referred to by reference numeral 12. The transmission 12, although adapted to be installed in an automotive vehicle, could also be adapted for stationary installations as well as other type vehicle installations. The traction drive contact pressure between the drive engaging elements of the transmission is established by a traction pressure regulator component generally referred to by reference numeral 14. The drive ratio of the transmission is varied by means of a drive ratio shift control component 16. The speeds of the traction drive elements in the transmission are sensed by speed sensors referred to by reference numeral 18. The traction drive ratio setting of the transmission is sensed by a sensor 20 while in accordance with a preferred embodiment the contact drive or traction pressure between the drive elements is sensed by a sensor 24. The speed sensors 18 feed their signals to a computer circuit 22 of the system in order to determine the actual speed ratio which will differ from a theoretical "no slip" ratio corresponding to the drive ratio setting sensed by component 20 based on the known geometry of the transmission. The signal outputs of the traction drive ratio sensor 20 and the speed ratio computer 22 are compared by a slip computer circuit 26 to provide a slip signal fed to a slip/pressure ratio computer 27. The computer 27 compares the actual slip signal with the output from the traction pressure sensor 24. A ratio signal is thereby developed by computer 27 and fed to interface circuit 28 from which correction signals are supplied to the traction pressure regulator 14. The traction ratio shift control 16 receives a drive ratio change suppression signal from the slip computer 26. Operation of the regulator 14 and control 16 may also be influenced through circuit 28 by other factors associated with an automotive vehicle installation. Thus, FIG. 1 shows the circuit 28 receiving signal inputs from a drive ratio selector 30, a speed control 32, a brake pedal 34 and an emergency brake 36.

Figure 2:
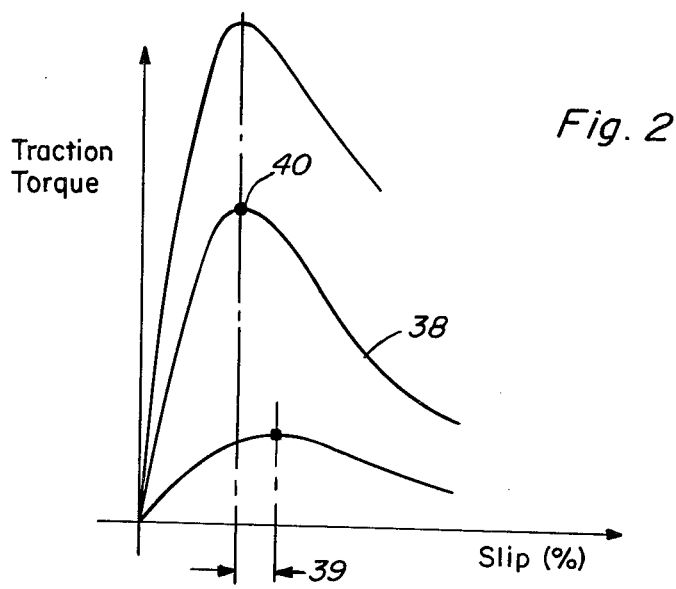
FIGS. 2, 2A, 2B, 2C and 2D are graphical illustrations of traction pressure-slip relationships underlying operation of the present invention.
Figure 2B:
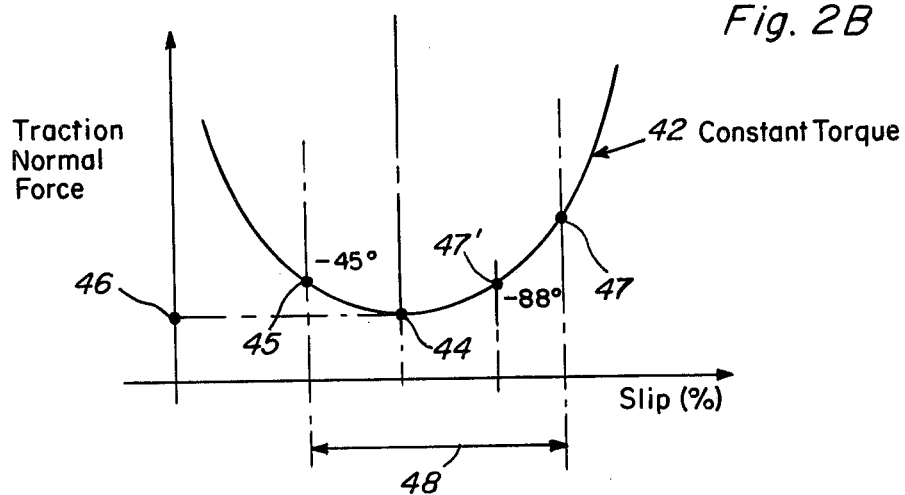
Figure 2A:
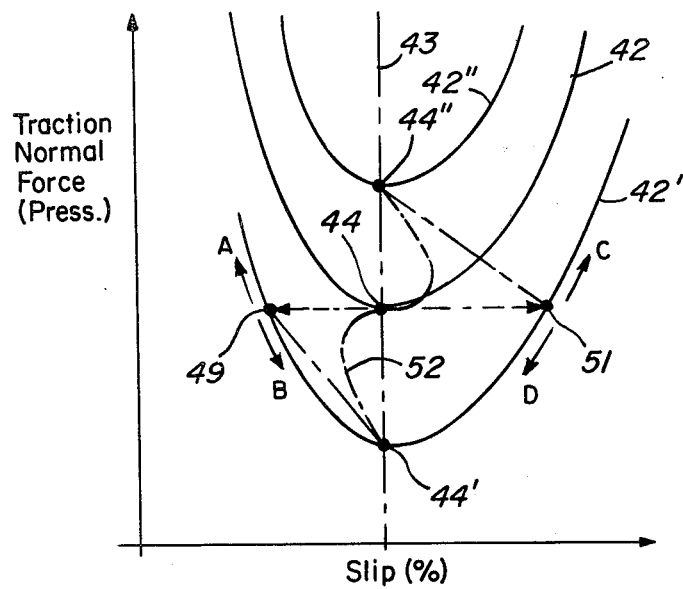

According to one embodiment of the present invention, various physical conditions associated with a traction drive transmission are analyzed in order to determine the optimum traction pressure without measuring deviations in those conditions which tend to alter optimum slip values, such as temperature, oil properties, surface conditions of the traction components, traction component geometry and peripheral velocities. The system seeks out the optimum slip value for any and all conditions, even as they vary. In order to understand the underlying rationale behind the system of the present invention, one should appreciate that the performance exhibited by all known traction devices is characterized by similar traction coefficient curves which have an optimum "peak" as will be apparent from FIG. 2 illustrating a typical family of constant traction pressure curves 38 under given conditions as aforementioned. The curves 38 are plotted against an ordinate representing traction force or torque and an abscissa representing percent slip. At very low loads, a slight shift 39 may occur in the peak traction points 40 toward increased slip values. The same data from which curves 38 are derived is used to plot a family of constant traction force curves 42, 42' and 42" as shown in FIG. 2A wherein the ordinate represents traction normal force in terms of pressure and the abscissa represents percent slip. At the peak point 44 of the curve 42 as shown in FIG. 2B, its slope is horizontal or 90° corresponding to a normal traction pressure force denoted at 46 on the ordinate. Therefore, at this peak point of the curve, the rate of change of slip divided by the rate of change of the traction pressure force approaches infinity $\Delta slip/\Delta force \rightarrow \infty$. This condition exists in a narrow band and corresponds to a super-critical point of operation of the traction drive. Since the system of the present invention is based upon computation of the ratio of change in slip to change in normal traction force, a reference value is arbitrarily selected to establish the narrow band of accepted computed values embracing the critical operational point 44 on the traction curve 42. In this manner, continuous hunting in the control system is avoided, since it remains quiescent for any conditions producing change ratio values greater than those in the computational band established by the selected reference value. By way of example, FIG. 2B illustrates a control band denoted by reference numeral 48 established between points 45 and 47 on the curve 42 at which the slope is 45° on either side of the peak point 44. Although the ratio value at points 45 and 47 is 1.000, corresponding to the 45° slope shown, other ratio values could be represented at such points depending on the scale of the coordinates. It will be noted from FIG. 2B, however, that the selection of the reference value establishes a control band that is asymetrical with respect to the critical point 44 and offset toward higher slip. To overcome this asymmetry, signal suppression as a function of absolute slip is utilized to produce a control band between point 45 of +45° slope and point 47' of −88° modifying the operative band of curve 42 bringing point 47 to point 47'.

Figure 2C:
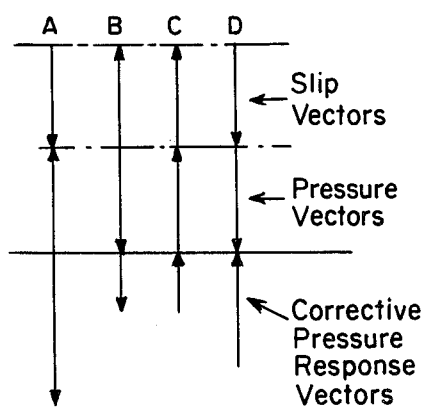

With continued reference to FIG. 2A, the effect of corrective action in accordance with the present invention is graphically depicted. Beginning with optimum slip at point 44 on constant pressure curve 42, a sudden decrease in external load causes a decrease in slip toward point 49 on a lower constant traction curve 42' corresponding to a corrective reduction in traction pressure effected in order to induce return of slip to the optimum value at point 44'. An increase in external load, on the other hand, causes an increase in slip toward point 51 on curve 42'. However, any increase in slip is occasioned by a corrective increase in traction pressure inducing return of slip to an optimum value at point 44" on a higher constant traction curve 42". The corrective pressure response curve 52 therefore depicts the pressure slip relationship during the correction action and is confined to limits established by points 49 and 51 on curve 42'. Changes in the relationship between traction force and slip at points 49 and 51 are denoted by traction pressure vectors A, B, C and D. Vector A denotes an increasing traction pressure as slip is decreasing while vector B denotes a decreasing traction pressure as slip is increasing. Both vectors A and B arise during an overpressure condition or insufficient slip. Vectors C and D, on the other hand, arise during an underpressure condition or overslip with vector C depicting an increasing traction pressure as slip is increasing while vector D depicts a decreasing pressure as slip is decreasing. The foregoing pressure vectors are shown on the vector analysis diagram of FIG. 2C, opposed by corresponding slip vectors. To bring point 49 on curve 42', representing the overpressure condition, toward point 44', requires a reduction in pressure and an increase in slip as observed from FIG. 2A. Accordingly, a relatively large pressure reducing correction is provided for vector A as depicted by correction response vector in FIG. 2C to overcome the incorrect pressure trend. A relatively small pressure reducing correction vector is provided for vector B since it is additive to pressure vector B. To bring point 51, representing the underpressure condition, toward point 44", pressure must be increased. Accordingly, increasing correction response vectors are shown in FIG. 2C for the pressure vectors C and D. Since vector C is additive with respect to its correction vector, the correction vector for vector C is relatively small as compared to the correction vector for pressure vector D. This provides anticipatory control overcoming mechanical momentum. It will also be noted from FIG. 2C, that any time the slip vectors are increasing (corresponding to pressure vectors B and C), a reduced correction response is required. Further, whenever slip or pressure trends are synchronous as reflected by like vectors, the correct control response is an increase in pressure. Thus, the direction and magnitude of the correction response may be controlled by the amount of slip detected and a computed rate of slip change to pressure change. Such factors are detected and computed in accordance with the present invention so as to produce the corrective responses as will be further explained in detail hereinafter.

Figure 2D:
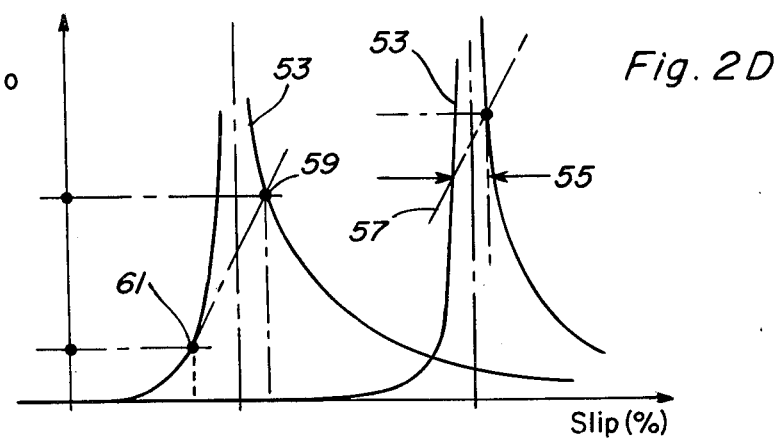

FIG. 2D graphically illustrates the relationship between the aforesaid rate factor, represented on the ordinate and the slip factor represented on the abscissa, based on the same data from which curves 38 are derived in FIG. 2. As seen in FIG. 2D, the peak efficiency operating point on curves 53 corresponding to point 44 in FIG. 2A, become infinite, regardless of the absolute slip at which it occurs and regardless of the transmission variables. In the analog system devised in accordance with the present invention, a voltage proportional to the computed rate ratio represented by the ordinate in FIG. 2D is generated by computer 27 as a function of slip. Arbitrary rate ratio limits establish the operational slip bands 55 for each curve 53 as shown in FIG. 2D and such bands are automatically shifted in ratio level in proportion to slip in order to obtain a band centering effect wherein the infinite peak point is centered within the slip band. Such centering effect is shown by a linear reference line 57 intersecting the curve 53 at points 59 and 61 between which the slip band is defined.

Figure 3:
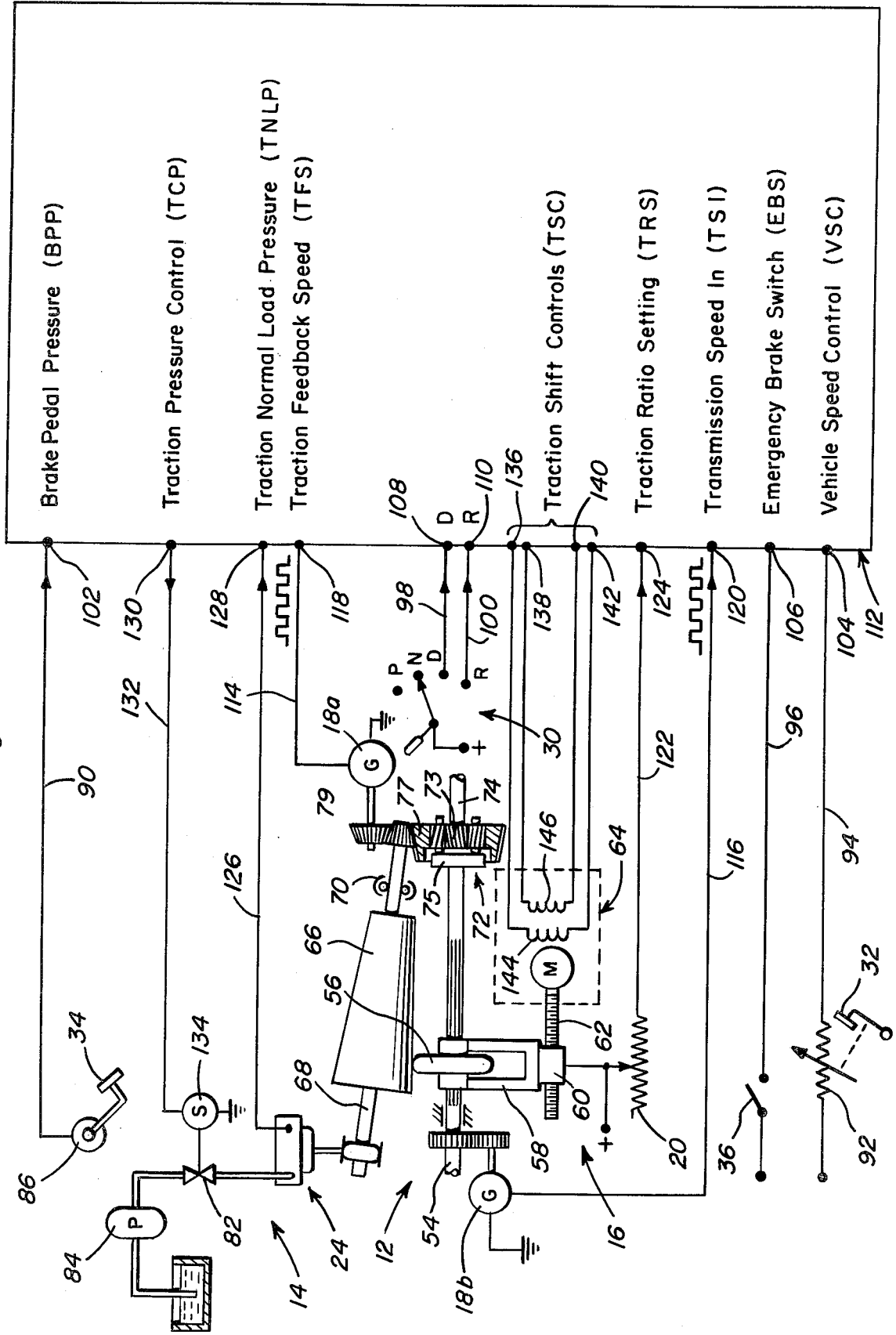
FIG. 3 is a schematic illustration of a traction drive transmission and controls with its interfacing to the control system of the present invention.

FIG. 3 schematically illustrates the transmission 12 as the source of data in accordance with one embodiment of the invention, including an input shaft 54 that is supported for rotation about a fixed axis and splined for slidably mounting a traction roller 56. The traction roller is rotatable with the input shaft 54 and is axially displaceable therealong by means of a carriage 58. The carriage is axially shifted by means of the drive ratio shift mechanism 16 referred to in FIG. 1 including, for example, an internally threaded nut 60 engaged by a screw shaft 62 connected to a ratio setting motor 64 of a reversible series type. The drive ratio setting position of nut 60 is sensed by the sensor 20 in the form of a linear potentiometer as shown. The axially movable traction roller 56 engages a conical roller 66 rotatably mounted by a shaft 68 having a contacting surface parallel to shaft 54 and a self-aligning bearing at pivot 70 in order to maintain contact with the drive roller 56 for all axial positions thereof and compensate for any bending moment of conical roller 66 with a minimal stress on shaft 68. The conical roller shaft 68 is drivingly connected to one of the speed monitors 18a in the form of an RPM pulse generator in the illustrated embodiment and to planetary gearing 72 having a driven sun gear 73 connected to an output shaft 74. The input shaft 54 is also drivingly connected to the planet carrier element 75 of the differential gearing 72 and to the other of the speed sensor 18b in the form of an RPM pulse generator. The gearing 72 also includes planet pinions on the carrier element in mesh with the sun gear 73 and orbit gear 77 to which shaft 68 is drivingly connected by drive gear 79. The traction contact pressure established between the rollers 56 and 66 will be determined by the force applied to the shaft 68 through the pressure contact regulator 14 having the traction pressure monitor 24 associated therewith in the form of a pressure transducer. The amount of traction force applied is controlled by a pressure control valve 82 connected to a pump 84 associated with the regulator 14. A pressure transducer 86 is associated with the brake pedal 34 for producing a brake pedal pressure signal in signal line 90.

When the transmission 12 is associated with an automotive vehicle installation as shown in FIG. 3, in addition to the brake pedal 34 from which a brake pedal pressure signal is delivered through line 90, the vehicle speed control 32 is operative through an adjustable resistor 92 to deliver a vehicle speed control signal through signal line 94. Also, the emergency brake switch 36 supplies a signal through signal line 96. The vehicle will also be provided with the drive ratio selector 30 aforementioned in connection with FIG. 1. The selector 30 is operative to provide logic signals to the control system through signal lines 98 and 100 as shown in FIG. 3 when the drive ratio selector is in the drive or reverse position. The vehicle operating control signals in input signal lines 90, 94, 96, 98 and 100 are, respectively, connected to terminals 102, 104, 106, 108 and 110 of a signal terminal assembly for interfacing with the control system generally referred to by reference numeral 112, as shown in FIG. 3. Through the same signal terminal assembly, the speed monitoring signals from the RPM pulse generators 18a and 18b are delivered by input signal lines 114 and 116 to terminals 118 and 120, respectively. The traction drive ratio setting of the transmission is sensed by sensor 20 in the form of a linear potentiometer supplying its position signal through input signal line 122 to terminal 124. Finally, the traction normal force exerted by contact pressure regulator 14 is sensed by a signal supplied from sensor 24 through input signal line 126 to terminal 128. As a result of the input data supplied by the foregoing input signal lines, a correction signal for correctively varying the traction force applied by the traction pressure regulator 14 is supplied from terminal 130 through output signal line 132 to a valve operating servomotor 134 connected to the pressure control valve 82. Also, traction shift control terminals 136, 138, 140 and 142 are connected by output signal lines to the windings 144 and 146 of the reversible motor 64 of the control 16.

Figure 4:
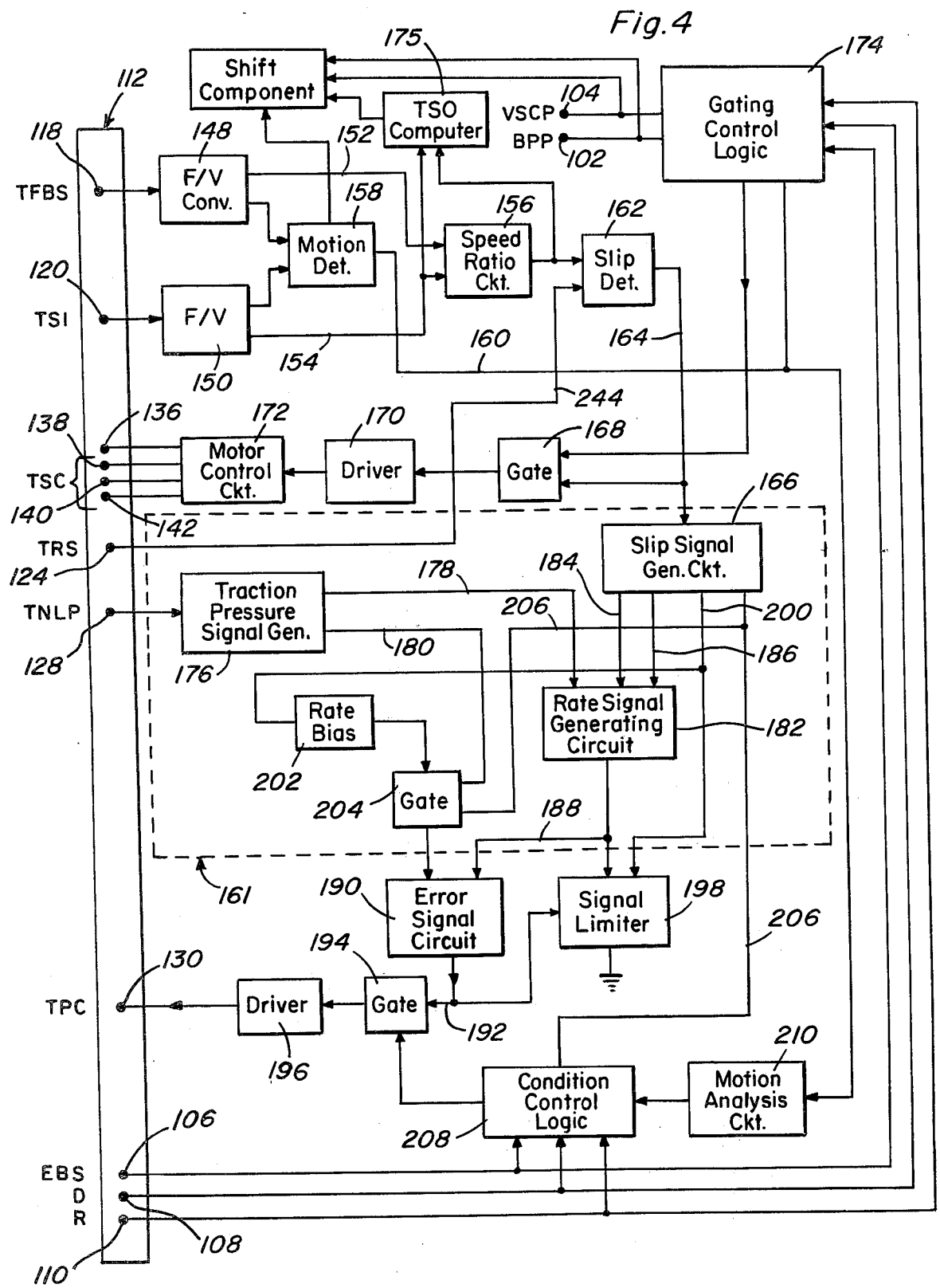
FIG. 4 is a schematic block diagram depicting the control system in greater detail.

FIG. 4 diagrammatically illustrates the control system to which the signal terminal assembly 112 is connected for carrying out the operations functionally described with respect to FIG. 1. While an analog type of data processing system is hereinafter described, it will be appreciated that the present invention also contemplates a functionally equivalent digital system. By use of an analog system, ratio and/or product signals may be readily generated by first converting the analog data inputs to logrithmic values and then combining them through a differential or summing amplifier. The output of the amplifier then undergoes an anti-log conversion to yield a computational response.

Thus, the input speed sensing signals in the form of pulses appearing at terminals 118 and 120 are respectively fed to frequency to voltage converters 148 and 150 in order to develop analog speed signals in lines 152 and 154 from which the actual speed ratio between the traction drive elements 56 and 66 of the transmission are calculated by a speed ratio circuit 156. Signal voltage outputs from the frequency to voltage converters 148 and 150 are also fed to a motion detector circuit 158 from which a motion signal is applied to line 160 for purposes to be explained hereinafter. The actual speed ratio output of the circuit 156 is compared with the theoretical speed ratio signal voltage at terminal 124 by a slip detector circuit 162 producing an output in line 164 corresponding to the actual slip occurring in the transmission. According to the embodiment shown in FIG. 4, the output of the slip detector 162 is applied by line 164 to an automatic signal generating section generally referred to by reference numeral 161 including a slip signal generating circuit 166 from which four different output signals are obtained as different functions of the input slip signal in line 164. The slip signal output in line 164 is also fed through a control gate 168 to a driver 170 thereby rendered operative to supply a proportional slip signal to the drive ratio shift control motor 64 through motor control circuit 172 connected to four control terminals 136, 138, 140 and 142 associated with the motor 64. The motor control circuit through the transmission ratio shift system reduces acceleration loading of the traction elements should abnormally high slip occur. The gate 168 is controlled by the gating control logic 174 as shown in FIG. 4 for introducing other control factors influencing changes in transmission drive ratio. The signal inputs from terminals 102, 104 and 106 are connected to the gating control logic 174 as well as signal line 160 from the motion detector 158. Also, the drive ratio selector terminals 108 and 110 are connected to the gating control logic 174. No detailed disclosures of the control logic 174, the signal inputs thereto, the transmission speed output computer 175 and shift component 16 are presented herein since they relate to vehicle control systems well-known in the art, whereas the present invention is concerned only with those control influences which are operative to produce corrective variation of the traction force by an output applied to traction pressure control terminal 130. Jointly with the slip signal influence, the contact pressure signal at terminal 128 influences the corrective traction pressure signal developed at terminal 130 through a traction pressure signal circuit 176 from which two output signal lines 178 and 180 extend. The output signal in line 178 from the traction pressure signal generator 176 corresponds to a rate change of traction pressure being sensed and fed to a rate signal generating circuit 182. The rate signal generating circuit also receives two inputs from the slip signal generator circuit 166 through lines 184 and 186. Signal line 184 supplies a signal that corresponds to the change rate of slip while signal line 186 supplies a signal that corresponds to an inverse function of slip for purposes to be explained hereinafter. The output of the rate signal circuit 182 is applied through line 188 to error signal circuit 190 from which an error signal output is developed in line 192. The error signal in line 192 is fed to a control gate 194 from which a correction signal is applied to a driver 196 connected to the traction pressure control terminal 130. The driver 196 is of the integrator type which generates a basic control level signal influenced by the correction signal. A limited peak signal band of the signal output in line 188 from the rate signal circuit 182 is selected by the circuit 198. Operation of the signal limiting circuit 198 is influenced by a slip signal received from the signal generator circuit 166 through signal line 200. Also, the circuit 198 is connected to the error signal line 192 for the purpose of minimizing control hunting as will be explained hereinafter.

The slip signal output of the circuit 166 in slip signal line 200 is also connected to a rate bias circuit 202 to modify the rate signal in line 188 within the error signal circuit 190 to compensate for slip offset in the selected signal band. The rate bias is fed through a transmission control gate circuit 204 to the error signal circuit 190 for this purpose. Operation of the control gate circuit 204 is controlled by a logic signal in line 180 reflecting an increasing traction pressure and by a logic signal in line 206 from the slip signal generator circuit 166 reflecting an increasing slip. The gate 194 through which the error signal in line 192 is fed to driver 196 is controlled by a condition control logic 208 receiving signals from the emergency brake switch terminal 106, from the drive ratio selector terminals 108 and 110, from a motion analysis circuit 210 connected by signal line 160 to the motion detector circuit 158 and from circuit 166 through increasing slip logic line 206. The gate 194 is thereby rendered operative to prevent corrective change in traction pressure under certain transitional conditions as will be explained hereinafter.

Figure 5:
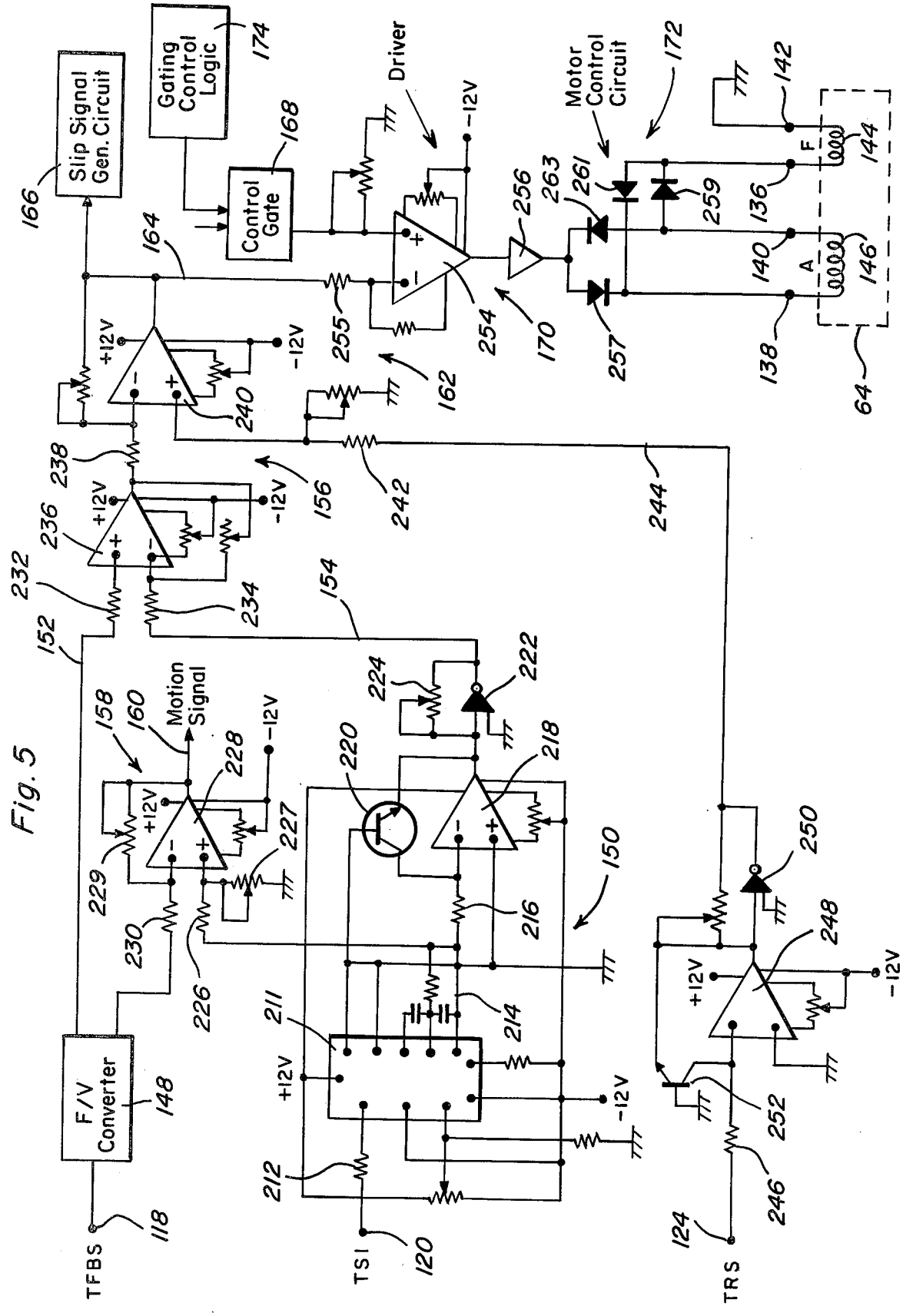
FIGS. 5, 6, 7 and 8 are electrical circuit diagrams illustrating in detail different portions of the control system in accordance with an analog type embodiment.

While the speed signal sensors 18a and 18b are in the form of RPM encoders, other speed sensing devices may be utilized such as permanent magnet generators, Hall effect sensors and mechanical or magnetic pulse pickup devices. The frequency-to-voltage converters 148 and 150 utilized are similar in arrangement, one of which is shown in detail in FIG. 5. Thus, the frequency to voltage converter circuit 150 as shown includes an integrated circuit chip 211 having an input pin to which the signal pulses from sensor 186 at terminal 120 are applied through a resistor 212. A corresponding analog voltage signal is obtained from the integrated circuit chip at its pin connected to output signal line 214. The output voltage signal in line 214 is applied through a resistor 216 to the inverting input terminal of an operational amplifier 218. Negative feed back for the operational amplifier is established by means of a grounded base transistor 220 producing an inverting logrithmic output in response to the analog input speed signal. The operational amplifier 218 is useful in making log conversions of the analog input signal in order to facilitate mathematical multiplication and division sequences. This technique is utilized elsewhere in the control system to be described hereinafter. Thus, a log speed signal at the output of operational amplifier 218 is passed by inverter 222 to speed signal line 154 in order to provide a direct signal response. Independent gain control for calibration purposes is provided by adjustable resistor 224.

The voltage speed signal in line 214 of the converter 150 is fed through an input resistor 226 to the non-inverting input of a differential amplifier 228 grounded through adjustable reference resistor 227 in the motion detector circuit 158. Similarly, the voltage speed signal from the converter 148 is applied through input resistor 230 to the inverting input terminal of the amplifier 228 having an adjustable feedback resistor 229.

The gain of the amplifier 228 will depend on the resistance values of the input terminal resistors 226 and 230 which are selected so that the output of amplifier 228 will be zero when the output speed of shaft 74 is zero under neutral conditions of the transmission. By virtue of the operational characteristics of the amplifier 228 and by appropriate adjustment of the resistance values of the resistors 227 and 229 in the motion detector 158, the output (Ws) of the motion detector in line 160 will be a function of the input signals (Wc and Wo) conducted by the input resistors 226 and 230, in accordance with the speed relationships in gearing 72, expressed as follows:

$$Ws = (2Cr\ Wc - Rr\ Wr)/Sr$$

where:
 Ws = speed of the output sun gear 73 of planetary gearing 72
 Wc = speed of the carrier 75
 Wr = speed of orbit gear 77
 Sr = radius of sun gear 73
 Rr = radius of orbit gear 77
 Cr = radius of carrier 75

The log speed signals in line 152 and 154 from the converters 148 and 150 are fed through resistors 232 and 234 to the non-inverting and inverting input terminals of operational amplifier 236 also connected as a differential amplifier in the speed ratio circuit 156. Thus, the output of amplifier 236 will be the difference between the log speed signals. The anti-log of the output signal from amplifier 236 therefore represents the actual speed ratio of the traction roller 66 to the traction roller 56. This logrithmic speed ratio signal is fed through resistor 238 to the inverting input terminal of a differential amplifier 240 in the slip detector circuit 162. The non-inverting input terminal of amplifier 240 receives a theoretical speed ratio signal through resistor 242 from signal line 244. The theoretical speed ratio reflected by the signal in line 244 must be in logrithmic form to conform with the logrithmic form of the actual speed ratio signal received from the speed ratio circuit 156. Toward that end, the traction ratio signal terminal 124 is connected by resistor 246 to a logrithmic amplifier 248, the output of which is connected by inverter 250 to the signal line 244. Negative feedback for the amplifier 248 is established through a base grounded transistor 252.

The logrithmic signal applied to amplifier 240 of the slip detector circuit 162 produces an output representing the magnitude of actual slip in logrithmic form. The slip signal from amplifier 240 is applied through signal line 164 to the slip signal generator circuit 166 as aforementioned and to the inverting input of a driver amplifier 254 of the driver 170 through resistor 255. The other non-inverting input of amplifier 254 receives its input signal through the control gate 168 from the gating control logic 174, the details of which form no part of the present invention as it applies to vehicle controls. Assuming that the amplifier 254 receives an appropriate voltage at its non-inverting input terminal to establish a desired nominal drive ratio, the slip signal voltage in line 164 will produce an output from amplifier 254 that may be either above or below the signal level corresponding to the input at the non-inverting terminal. This output is applied to a conventional push-pull power amplifier 256 which will apply a positive or negative voltage to the motor control circuit 172 dependent on the input signal level, for reversible operation of the drive ratio control motor 64.

Depending on the polarity of the motor operating signal applied to the motor control circuit, current will be conducted through the appropriate terminals for operation of the motor in one direction or the other. For Example, a positive voltage output from amplifier 256 will cause current to be conducted through diode 257, terminal 138, armature winding 146, terminal 140, diode 259, terminal 136, field winding 144, terminal 142 to ground. Current therefore flows through windings 144 and 146 in the same direction to operate the motor 64 in one direction. Current in the opposite direction will be conducted from ground terminal 142 through winding 144 to terminal 136, diode 261, terminal 138, winding 146, terminal 140 and diode 263 when a negative voltage output appears at amplifier 256 for operation of the motor in the other direction because of current flow in the opposite directions through the windings 144 and 146. Automatic motor reversal is thereby effected to change the transmission ratio at a rate dependent on vehicle speed control and other factors introduced through gate 168 and vehicle control logic 174 and to effect the aforementioned slip suppression of the transmission ratio shift by restricting the rate of shift when abnormally high slip occurs at the traction contact locations.

Figure 6:
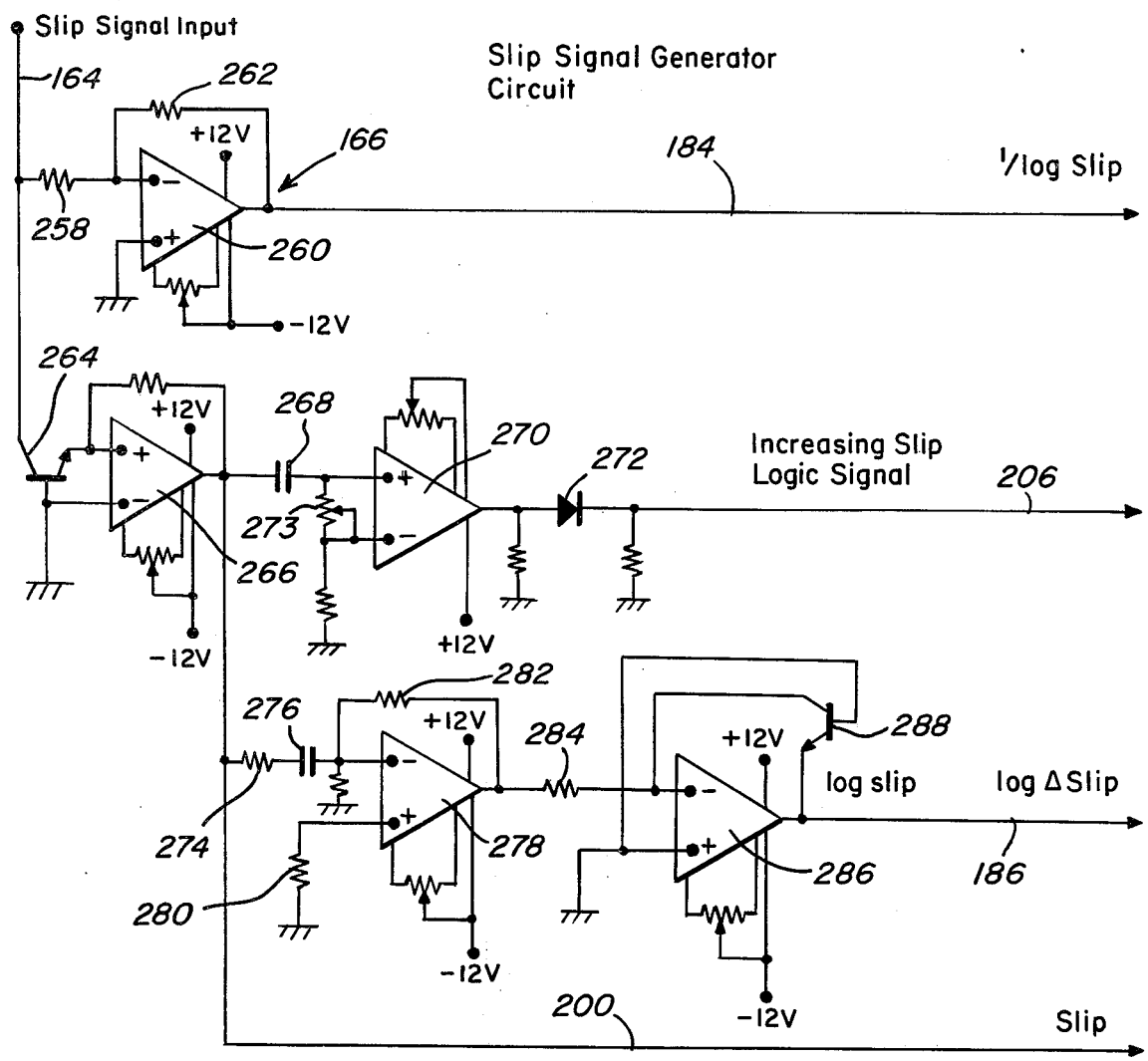

The slip signal generator circuit 166 aforementioned is shown in detail in FIG. 6. The input signal in line 164 which is in logrithmic form from the slip detector circuit is fed by resistor 258 to the inverting input of amplifier 260 having a non-inverting input connected to ground and a negative feedback resistor 262. Thus, the output of amplifier 260 corresponds to a reciprocal of the log slip signal 1/(log slip) and is applied to output signal line 184.

The logrithmic slip signal (log slip) in line 164 is applied through a base grounded transistor 264 to the non-inverting input of amplifier 266 for anti-logrithmic conversion. Thus, an antilog output is obtained from amplifier 266 applied to line 200 as an analog slip signal.

The slip signal in line 200 is fed through signal capacitor 268 to the non-inverting input of operational amplifier 270. The inputs of the amplifier 270 are interconnected by an adjustable resistor 273 so that it will maintain only two stable conditions. Because of the capacitor 268 in series with the non-inverting input of the amplifier, a current reversal occurs anytime the value of slip changes producing a +/− vector response in amplifier 270 reflecting a change in slip conditions. The output of amplifier 270 is connected by diode 272 to signal line 206 to isolate it from a negative change and provide a logic signal thereto anytime slip increases.

The slip signal in line 200 is also applied through resistor 274 and capacitor 276 to the inverting input of operational amplifier 278 having a non-inverting input terminal connected to ground through resistor 280 and a negative feedback resistor 282. Because of the capacitor 276, amplifier 278 is rate sensitive producing an output that is the reciprocal of a change in slip or $1/(\Delta \text{ slip})$. This output is applied through resistor 284 to the inverting input of an operational amplifier 286, arranged for logrithmic signal conversion by means of a base grounded transistor 288 connected in negative feedback relationship between the inverting input and the output of the amplifier 286. Thus, the output of amplifier 286 applied to signal line 186 is in the form of (log $\Delta$ slip).

Figure 7:
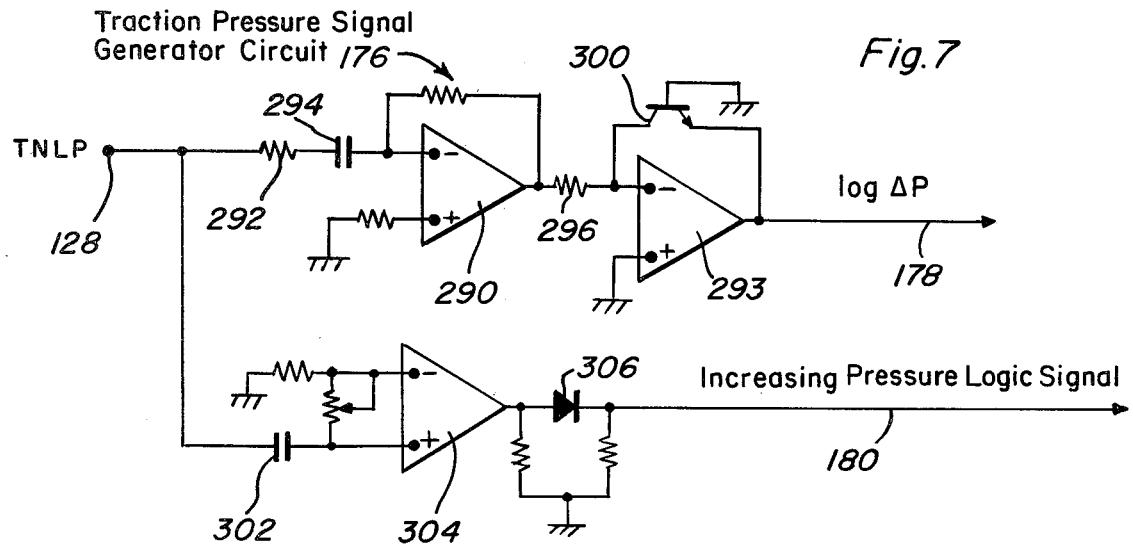

FIG. 7 shows in detail the traction pressure signal generator 176 connected to the traction pressure signal terminal 128. The signal terminal 128 applies the analog voltage signal proportional to the engaging pressure of the traction elements of the transmission to an operational amplifier 290 through series connected resistor 292 and capacitor 294 making the amplifier rate sensitive through its inverting input terminal. Accordingly, the output of amplifier 290 is in the form of the reciprocal of a change in traction pressure $1/\Delta P$ fed through resistor 296 to the inverting input of operational amplifier 298 connected to output signal line 178. A base grounded, negative feedback transistor 300 renders amplifier 298 operative as a logrithmic converter producing an output in signal line 178 that is the logrithmic change in traction pressure (log $\Delta$ P).

The traction pressure signal at terminal 128 is applied through signal capacitor 302 to the non-inverting input of operational amplifier 304. The output of amplifier 304 is applied through diode 306 to the signal line 180 as an increasing traction pressure logic signal, using the same shunted input terminal technique as described hereinbefore with respect to amplifier 270.

Figure 8:
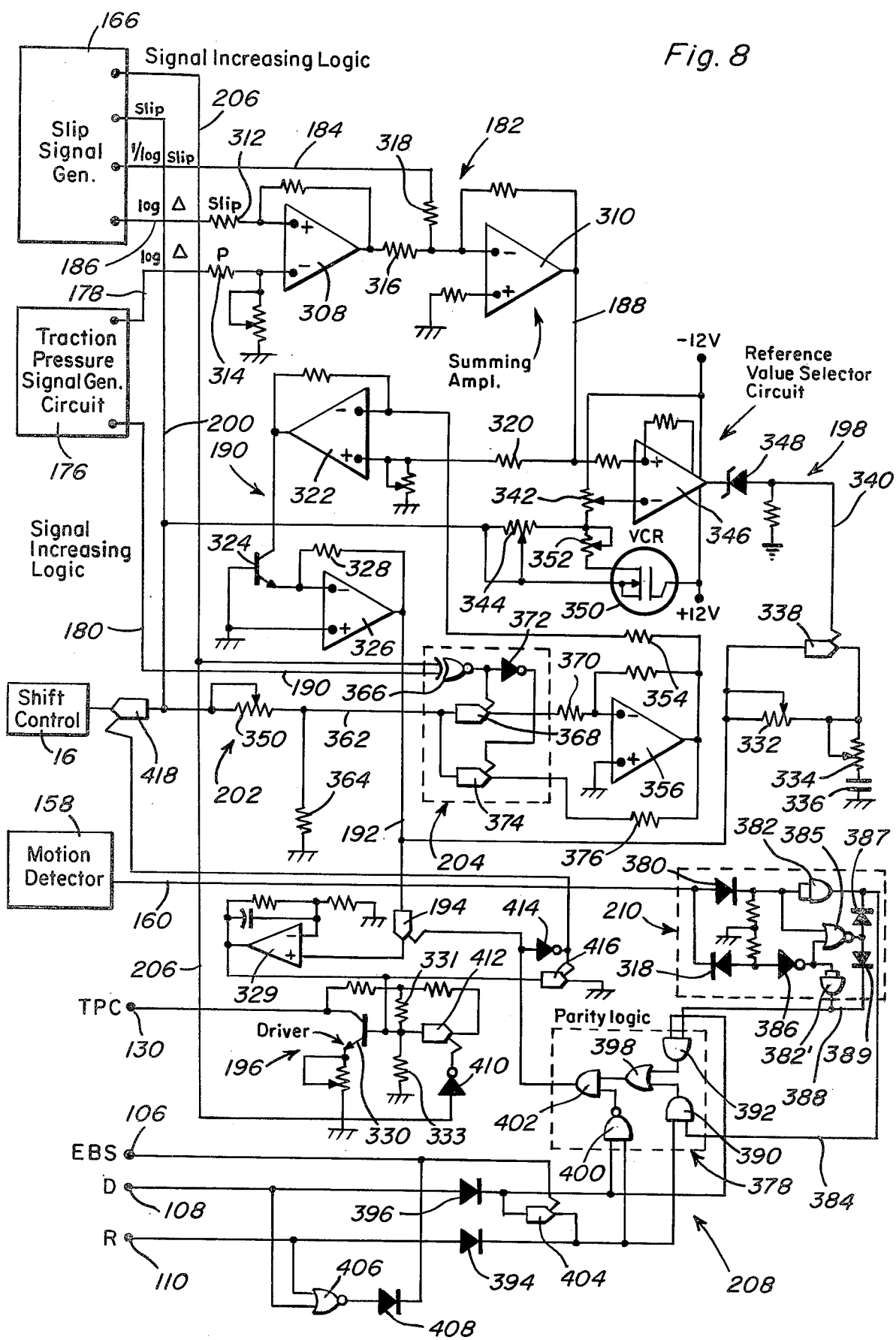

Referring now to FIG. 8, the rate control circuit 182 includes a differential amplifier 308 connected in series with a summing amplifier 310. Differential amplifier 308 receives the (log $\Delta$ slip) signal from the slip signal generator 166 through line 186 at its non-inverting input through resistor 312. At its inverting input terminal, the differential amplifier 308 receives the (log $\Delta$ P) signal in line 178 from the traction pressure signal generator 176 through resistor 314. The output of differential amplifier through 308 will therefore feed a (log Δ slip – log Δ P) signal to the inverting input of the summing amplifier 310 through resistor 316. The anti-log of the signal output of amplifier 308 Δ slip/Δ P corresponds to the derivative of the mathematical function depicted by traction curve 42 in FIG. 2A. The inverting input of the summing amplifier 310 also receives a signal 1/(log slip) through resistor 318 from the slip signal generator through line 184. Accordingly, a signal log Δ slip – log Δ p+1/(log slip) is produced at the output of the summing amplifier applied to signal ine 188. The anti-log of the foregoing output signal in line 188 is (Δ slip/Δ P)·(1/slip) and corresponds to a modification of the rate ratio signal decreased by the product of reciprocal of slip. Such rate signal modification makes the system more responsive to rate ratios at high slip and tends to operate the system at lower slip values within the operating band selected by the ratio reference value conforming to the asymmetry suppression hereinbefore discussed with respect to curve 42 in FIG. 2A.

The logrithmic rate ratio signal output of the rate control circuit 182 in line 188 is fed through resistor 320 to the non-inverting input of operational amplifier 322 in the error signal circuit 190. The output of amplifier 322 is applied through a grounded base transistor 324 to the inverting input of amplifier 326 for generating an anti-log converted error signal. The signal limiting circuit 198 to which the rate signal line 188 is also connected is operative to limit the output of amplifier 326 to a selected band. Amplifier 326 having a negative feedback resistor 328 will maintain an error signal voltage in line 192, except when amplifier 346 is operational, to dampen the signal output of the amplifier and thereby desensitize the system to reduce hunting. This error signal voltage is applied through gate 194 to the input base of transistor 330 in the drive circuit 196 through an integrator amplifier 329. Base bias for the driver transistor 330 is established through voltage dividing resistors 331 and 333 to control the gain of the driver transistor. The output collector of the driver transistor 330 will therefore supply a correction voltage signal to terminal 130 for operation of the valve positioning servo 134 to correctively change the traction pressure applied to the transmission.

The error signal line 192 is connected to an RC network formed by series connected adjustable resistors 332 and 334 and capacitor 336. Resistor 322 is shunted by opening of a signal controlled gate 338 under control of logic signal line 340 in order to minimize control hunting by changing the resistive value of the RC network when the rate signal input to the circuit 198 is within the selected signal band determined by selection of a reference value through potentiometer 342. The setting of potentiometer 342 determines the effective signal level of the slip signal voltage in line 200 applied through adjustable resistor 344 to the inverting input of amplifier 346, necessary to produce a positive output voltage. The slip signal in line 200 applied through resistors 344 and 342 to the inverting input of amplifier 346, is also applied as a control signal to the voltage controlled resistor 350 operable as a variable negative feedback for amplifier 346 to vary the signal level at the non-inverting input as a function of slip. When the output of amplifier 346 exceeds a certain value, Zener diode 348 connected to the output of the amplifier 346 is caused to breakover and provide a logic signal through line 340 to the signal controlled gate 338 aforementioned. Thus, the affect of changes in the rate signal in line 188 on the error signal will be desensitized by the change in resistive value of the RC network connected to the error signal line 192, in order to minimize control hunting. The slip signal in line 200 causes a higher ratio change calculation to be required, thereby making the system more critical at higher slip values.

The signal band limited output of amplifier 322 in the error signal circuit 190 is modified by a rate bias signal applied to its inverting input terminal through resistor 354 from a signal inverting amplifier 356 in order to suppress the slip offset condition aforementioned. The bias signal is therefore derived as a function of slip by the rate bias circuit 202 which includes adjustable resistor 358 connected to the slip signal line 200 and a bias voltage line 362 separated from ground level by resistor 364. The bias voltage thus varies with slip and is applied to the inverting input terminal of amplifier 356 through the transmission gate circuit 204. The transmission gate circuit will be operative to either apply or remove the bias voltage from amplifier 322 at its inverting input terminal to either enhance or retard the rate ratio signal from line 188.

The modifying effect of the bias voltage on the rate signal output of amplifier 322 is controlled by gate circuit 204 so as to conform with the modification transforming point 47 of the traction curve 42 to the modified point 47' as depicted in FIG. 2A. Toward that end, the gate circuit 204 is arranged to produce an increase in the rate signal level whenever the slip and traction pressure values are changing in the same direction, and decrease the rate signal level whenever the slip and traction pressure are changing in the opposite directions in accordance with the vector analysis hereinbefore described with respect to FIG. 2B. The transmission gate circuit 204 includes Exclusive NOR gate 366 having inputs connected to the increasing signal logic lines 206 and 180. When the same logic signals appear in both lines 206 and 180, a logic "1" output is obtained from gate 366. Otherwise, a logic "0" output is obtained. A directionally synchronized change in slip and traction pressure will therefore be operative through gate 366 to open signal controlled gate 368 and apply the bias voltage in line 362 to the inverting input of amplifier 356 through resistor 370. The inverted output of amplifier 356 will thereby decrease its negative effect on the rate signal applied to the inverting input terminal of amplifier 322. On the other hand, when the change in slip and traction pressure is not directionally synchronized, the gate 366 will turn off or close the signal controlled gate 368 and will be operative through inverter 372 to turn on signal controlled gate 374. The opened gate 374 will then pass the rate bias voltage through resistor 376 to the amplifier 322 in bypass relation to the amplifier 356. The bias voltage directly applied to amplifier 322 will then have an increasing negative effect on the rate signal.

The condition control logic 208 includes a parity logic section 378 from which a control signal is applied to gate 194 in order to prevent application of the correction and control signal by the driver 196 to terminal 130 under certain conditions. For example, traction pressure should be prevented whenever there is no parity between the motion of the vehicle and the position of drive ratio selector 30. Toward that end, the motion signal line 160 is connected to the motion vector analysis circuit 210 having a pair of reversely arranged diodes 380 and 381. Diode 380 is connected in series with AND gate 382 to line 384. Diode 380 is also connected to one input of a NOR gate 385. A positive voltage signal in line 160 representing forward motion is passed by diode 380 and transmitted by AND gate 382 as a logic "1" output to line 384. The positive signal voltage is also applied to one input of NOR gate 385 which then outputs a logic "0" isolated from lines 384 and 388 by diodes 387 and 389 while diode 381 isolates inverter 386 so that a logic "0" is applied to the other input of NOR gate 385 and to AND gate 382' producing a logic "0" in line 388. A negative voltage signal in line 160 representing reverse motion causes diode 381 to conduct so that inverter 386 connected in series therewith applies a positive voltage signal to AND gate 382' which outputs a logic "1" to line 388. The positive output of inverter 386 is also applied to NOR gate 385 so as to output a logic "0" as before. The motion vector signal lines 384 and 388 are respectively connected to input terminals of the AND gates 390 and 392 in the parity logic section 378. The other inputs of the AND gates 390 and 392 are connected to the drive ratio selector terminals 108 and 110 through diodes 394 and 396. Thus, during forward motion of the vehicle a positive logic signal in line 388 applied to AND gate 392 will be ordinarily occasioned by a positive logic signal at terminal 108 applied to the other input of AND gate 392 supplying a positive logic signal to OR gate 398 which feeds a positive logic signal to one input of AND gate 402. At the same time, the positive logic signal at terminal 108 is applied to one input of NAND gate 400 which feeds a positive logic signal to AND gate 402 in the parity logic section. The outputs of OR gate 398 and NAND gate 400 are applied to the inputs of AND gate 402 from which a logic signal is obtained to hold the gate 194 open. Should the vehicle driver change the position of the drive ratio selector 30, the gate 194 must be closed until all motion has ceased or parity is established between vehicle motion and the drive selector position in order to protect the system. No motion reflected by no signal in line 160 causes NOR gate 385 to output a logic "1" to lines 384 and 388 through diodes 387 and 389 making the system respond to either forward or reverse drive selections by the drivers. The change in selector position transfers the logic signal from terminal 108 to terminal 110 which is operative through the parity logic 378 to cause a change in the logic signal output from AND gate 392 without any change in the forward motion condition sensed by the motion vector analysis circuit 210. This causes the parity logic 378 to close gate 194. Once motion of the vehicle is stopped or parity is reestablished and is detected by the circuit 208, the gate opening logic signal output of the parity logic 378 is restored to open gate 194 once again.

In the event the emergency brake 36 is applied, a logic signal appears at terminal 106 and is applied to signal controlled gate 404. A logic signal appearing at either terminal 108 or 110 will cause signals to appear at both inputs to NAND gate 400 which then feeds a logic "0" to AND gate 402 in the parity logic causing an interruption in the error signal by closing of gate 194. The same interruption in error signal by closing of gate 194 occurs under control of the parity logic when the drive selector 30 is in either the neutral or park positions. This is accomplished by means of the NOR gate 406 having inputs respectively connected to the terminals 108 and 110. In the absence of any logic signals at both terminals 108 and 110, a logic signal output from the NOR gate is applied through a diode 408 to the signal controlled gate 404 to cause an interruption in the error signal as hereinbefore described with respect to application of the emergency brake producing a logic signal at terminal 106. Also, any time a parity error exists as reflected by a "0" output of AND gate 402 to control gate 194, inverter 414 will supply a logic "1" signal to gate 416 reducing the signal on the base of driver transistor 330 to ground level for removal of the traction clamping pressure from the system. Inverter 414 also supplies a control signal to gate 418 through which slip control of the transmission is provided to the shift component 16 when no traction pressure is applied. The drive ratio of the transmission is thereby synchronized with vehicle motion to prevent shock loads by reengagement of clamping pressure through the parity circuit 208.

Whenever there is an increase in slip, it is desired that the correction signal developed by the driver 196 for traction pressure control purposes be somewhat reduced. An increasing slip logic signal in line 206 will be applied through inverter 410 to a signal controlled gate 412 causing the gate to open, removing its shunting effect from resistor 331, and thereby introducing the voltage dividing resistor 331 into the base circuit of the driver transistor 330 causing a reduction in gain and a corresponding decrease in the output current from the driver transistor. When the correction voltage signal at terminal 130 causes a sufficient corrective change in traction pressure, the correction signal will desensitize as the rate signal output from the rate signal generator 182 falls within the narrow computational band selected through circuit 198. The system will therefore function automatically to maintain transmission 12 operating under optimum slip conditions.

Figure 9:
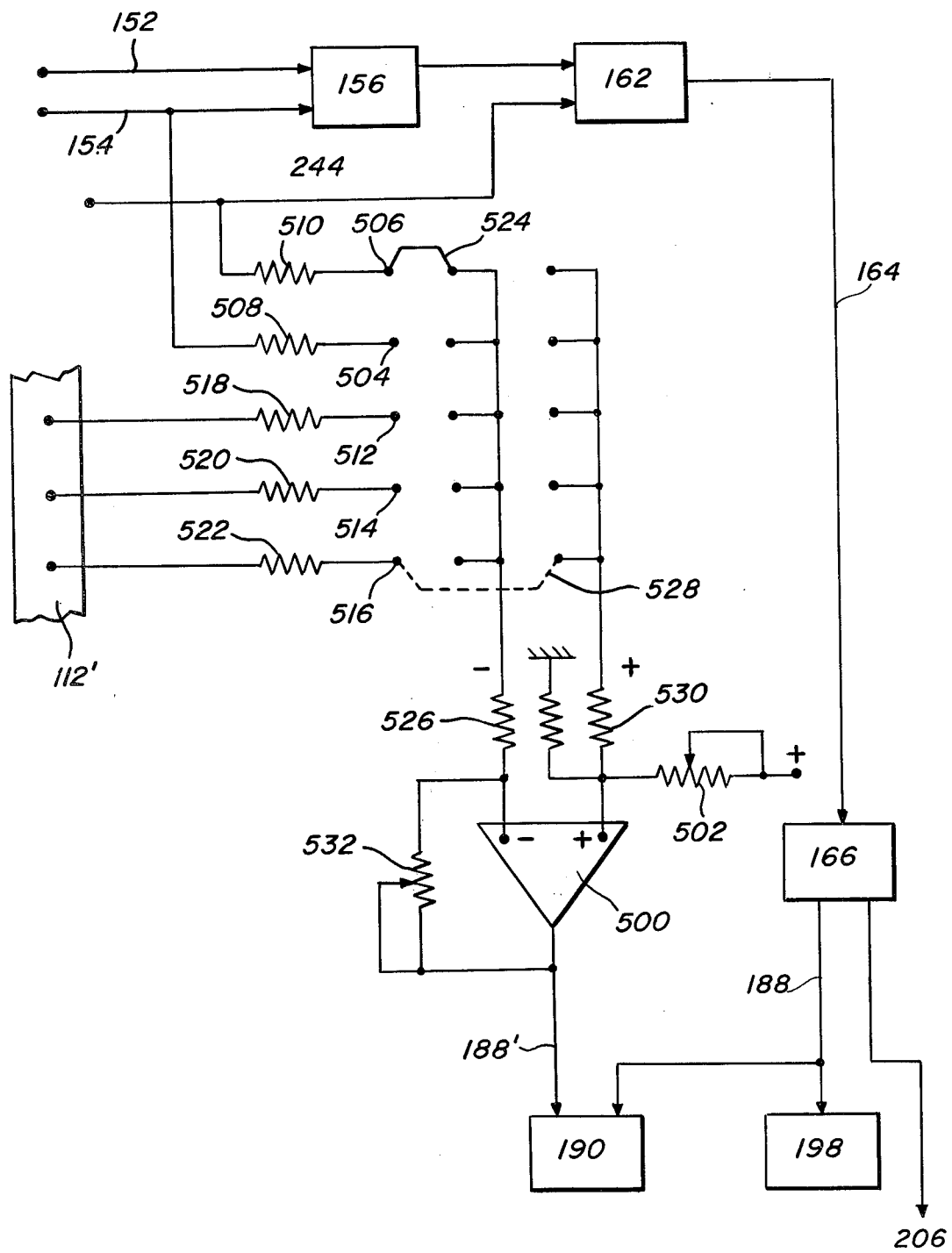
FIG. 9 is a partial circuit diagram showing a modification of the control system depicted in FIG. 4.

The data processing control system generally shown in FIG. 4, as hereinbefore described, automatically establishes the proper traction pressure to yield optimum efficiency, power transfer capacity and maximum service life regardless of traction variables relative to normal traction in accordance with an analysis of pressure-slip physics as set forth. For certain installations where external load parameters are less erratic and more easily controlled, such as industrial machine tool installations less subject to transients characteristic of automotive vehicle installations, less complex control circuitry may be utilized employing empirically derived optimum data techniques as shown in FIG. 9. According to this embodiment of FIG. 9, the signal generating section 161 as illustrated in FIG. 4 is replaced by a section including the slip signal generator circuit 166 and a summing amplifier 500 to which a positive input voltage is applied through an adjustable resistor 502 to obtain the proper initial bias. Signal lines 154 and 244 respectively supply peripheral velocity and traction ratio setting signals in logrithmic form to input jumper terminals 504 and 506 through resistors 508 and 510. External condition inputs in logarithmic form are also applied from suitable sensors to jumper terminals 512, 514 and 516 in order to obtain curvilinear response to such variable inputs as temperature, fluid characteristics, spin effects on traction, etc. Any one or all of the external conditions inputs are applied to the jumper terminals through resistors 518, 520 and 522. The inputs at the jumper terminals are connected either by a jumper connector 524 to the negative inverting terminal of the amplifier 500 through resistor 526 and/or through a connector 528 to the positive non-inverting terminal of the amplifier through resistor 530. Summing amplifier 500 is set to produce an optimum slip data, its output varying in accordance to the collective effects of a variety of inputs. Signal inputs fed through resistor 526 decrease the slip data value of amplifier 500 while the inputs fed through resistor 530 increase the slip data value for signal correction purposes. The collective effects of the variable inputs are adjusted by a gain control resistor 532 so that an empirically derived optimum slip signal output is obtained in line 188' connected as the input to the error signal circuit 190 hereinbefore described. Empirical adjustments are made through the bias adjustment of resistor 502 offset by predetermined empirically derived input signal levels for any number of variable conditions that would influence traction.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. For a variable speed transmission having traction engaging drive elements, a drive ratio change mechanism for effecting relative displacement of said drive elements, and a traction pressure regulating device for controlling traction pressure between said drive elements, a system for varying the traction pressure to maintain optimum slip between said drive elements, comprising a plurality of sensing means operatively connected to said drive elements, the traction pressure regulating device and the drive ratio change mechanism for respectively sensing the speed of the drive elements, the traction pressure and the drive ratio position of the mechanism, computer means connected to the sensing means for calculating actual slip between said drive elements from the sensed speed and the drive ratio position, rate calculating means connected to the traction pressure sensing means and the computer means for calculating the ratio between the change in said traction pressure and the change in said actual slip, and correction means connecting said rate calculating means to the traction pressure regulating device for correctively changing said traction pressure when said ratio deviates from a peak value.

2. The system of claim 1 wherein said computer means includes speed ratio circuit means for determining the speed ratio between said drive elements from the sensed speed, and slip detecting means connected to the speed ratio circuit means and the drive ratio setting mechanism sensing means for determining the actual slip, said drive ratio change mechanism being operatively connected to the slip detecting means for influencing a rate of change in drive ratio.

3. The system of claim 2 wherein said rate calculating means includes signal generator means connected to the traction pressure sensing means and the slip detecting means for respectively generating traction pressure and slip signals, and rate signal means connected to said signal generator means for producing a rate signal corresponding to the ratio of the change in slip to the change in traction pressure.

4. The system of claim 3 wherein said correction means includes signal limiting means connected to the rate signal means for limiting said rate signal to a peak signal band, signal modifying means connected to the slip signal generator means for modifying the rate signal, and driver means for developing a correction signal in response to the modified rate signal having a signal level outside of said peak signal band.

5. The system of claim 4 including gating control logic means connected to the correction means and rendered operative for preventing development of said correction signal, and parity logic means connected to the speed ratio circuit means and the drive ratio change mechanism for rendering the gating control logic means operative.

6. The system of claim 5 including gain control means connected to the slip signal generator means for reducing the signal level of the correction signal in response to increasing slip.

7. The system of claim 2 including gating control logic means connected to the correction means and rendered operative for preventing development of said correction signal, and parity logic means connected to the speed ratio circuit means and the drive ratio change mechanism for rendering the gating control logic means operative.

8. The system of claim 4 including gain control means connected to the slip signal generator means for reducing the signal level of the correction signal in response to increasing slip.

9. For a variable speed transmission having traction engaging drive elements, a drive ratio change mechanism for effecting relative displacement of said drive elements, and a traction pressure regulating device for controlling traction pressure between said drive elements, a system for varying the traction pressure to maintain optimum slip between said drive elements, comprising a plurality of sensing means operatively connected to said drive elements, the traction pressure regulating device and the drive ratio change mechanism for respectively sensing the speed of the drive elements, the traction pressure and the drive ratio position of the mechanism, means connected to the traction pressure sensing means for electronically generating a rate signal corresponding to the ratio of change in slip derived from the sensed speed and the drive ratio position to the traction pressure sensed, means connected to said electronic generating means for selecting a signal band embracing a peak value of the rate signal, and means connected to the traction pressure regulating device and responsive to deviation of the rate signal from said signal band for correctively varying the traction pressure.

10. The system of claim 9 including means for modifying said rate signal to compensate for slip offset within the signal band.

11. For a variable speed transmission having traction engaging drive elements, a drive ratio change mechanism for effecting relative displacement of said drive elements, and a traction pressure regulating device for controlling traction pressure between said drive elements, a method of varying the traction pressure to maintain optimum slip between said drive elements, including the steps of: measuring the speeds of said drive elements, the traction pressure therebetween and the drive ratio setting of the drive ratio change mechanism; electronically generating a rate signal from the measured speeds, the traction pressure and the drive ratio setting, said rate signal being a function of the ratio of change in slip to change in traction pressure; selecting a signal band embracing the peak level of said rate signal; and correctively changing the traction pressure exerted by the regulating device in response to deviation of the rate signal from the selected signal band.

12. For a transmission having input and output members, traction drive elements in engagement with each other under a surface contact pressure to establish a power transmitting path between said input and output members and drive ratio control means operative through said traction drive elements to change the drive ratio of the transmission, a method of varying the surface contact pressure to obtain optimum slip, including the steps of: sensing the setting of the drive ratio control means and measuring speed of said input and output members, calculating the actual slippage between said traction drive elements of the transmission from the sensed drive ratio setting and measured speed, comparing empirical data representing optimum slippage for each of the drive ratios with said calculated slippage to determine a slippage error; and adjusting the contact pressure to correct said determined slippage error.

13. The combination of claim 12 wherein the actual slippage is calculated by comparing the measured speeds of the input and output members to determine actual speed ratios; calculating speed ratios without slippage from the drive ratio settings, and comparing the calculated speed ratios with said actual speed ratios to determine actual slippage.

14. In combination with a transmission having input and output members, traction drive elements in engagement with each other under a surface contact pressure to establish a power transmitting path between said input and output members and drive ratio control means operative through said traction drive elements to change the drive ratio of the transmission, the improvement residing in control means for varying the surface contact pressure, including means for sensing the drive ratios established by the drive ratio control means and the actual speed ratios between said input and output members, data processing means connected to said sensing means for calculating the slippage between said traction drive elements for each of the drive ratios of the transmission, means for generating empirical data representing optimum slippage for each of the drive ratios, comparator means connected to said generating means and the data processing means for producing a corrective output signal, and servo means connected to said comparator means for adjusting the contact pressure in response to said corrective output signal.

15. In a transmission having input and output members, traction drive elements in engagement with each other under a surface contact pressure to establish a power transmitting path between said input and output members and drive ratio control means operative through said traction drive elements to change the drive ratio of the transmission, means for sensing the drive ratios established by the drive ratio control means and the actual speed of said input and output members, servo means for varying the surface contact pressure, and data processing means connected to said sensing means and the servo means for continuously adjusting the contact pressure to establish an optimum amount of slippage between said traction drive elements at all of the drive ratios of the transmission.

16. The combination of claim 15 wherein said sensing means includes speed sensors operatively connected to the input and output members, and a position sensor operatively connected to the drive ratio control means.

17. The combination of claim 15 wherein said data processing means includes section containing empirical data from which the optimum amount of slippage is derived.

* * * * *